United States Patent [19]

Urushidani et al.

[11] Patent Number: 4,583,363
[45] Date of Patent: Apr. 22, 1986

[54] SECONDARY AIR SUPPLY CONTROL DEVICE IN INTERNAL COMBUSTION ENGINE

[75] Inventors: Masahiro Urushidani, Toyota; Hidemi Oonaka, Susono, both of Japan

[73] Assignee: Toyota Jidosha Kabushiki Kaisha, Aichi, Japan

[21] Appl. No.: 773,511

[22] Filed: Sep. 5, 1985

Related U.S. Application Data

[63] Continuation of Ser. No. 449,743, Dec. 14, 1982, abandoned.

[30] Foreign Application Priority Data

Dec. 16, 1981 [JP] Japan ................................. 56-201458

[51] Int. Cl.[4] ............................................. F02B 75/10
[52] U.S. Cl. ......................................... 60/276; 60/290; 60/293
[58] Field of Search ........................... 60/276, 290, 293

[56] References Cited

U.S. PATENT DOCUMENTS

| | | | |
|---|---|---|---|
| 3,974,651 | 8/1976 | Nakajima | 60/290 |
| 4,068,472 | 1/1978 | Takata | 60/290 |
| 4,075,834 | 2/1978 | Saito | 60/290 |
| 4,149,376 | 4/1979 | Masaki et al. | 60/276 |
| 4,165,611 | 8/1979 | Ishikawa | 60/290 |
| 4,169,352 | 10/1979 | Iwata | 60/290 |
| 4,257,227 | 3/1981 | Sato | 60/293 |
| 4,376,427 | 3/1983 | Mizuno | 60/290 |

*Primary Examiner*—Douglas Hart
*Attorney, Agent, or Firm*—Parkhurst & Oliff

[57] ABSTRACT

A device for controlling the supply of secondary air in an internal combustion engine, having a secondary air control valve and a reed valve provided in the secondary air supply path and having a control circuit for receiving the output signal of an $O_2$ sensor and producing a control signal for air-bleeding control valves of a carburetor for the engine. The secondary air control valve is controlled in accordance with the opening degree of a throttle valve of the carburetor.

6 Claims, 3 Drawing Figures

SECONDARY AIR SUPPLY CONTROL DEVICE IN INTERNAL COMBUSTION ENGINE

This application is a continuation of application Ser. No. 449,743, filed Dec. 14, 1982, and now abandoned.

BACKGROUND OF THE INVENTION

The present invention relates to a device for controlling the supply of secondary air in an internal combustion engine. The device of the present invention is used for an internal combustion engine of an automobile.

In the prior art, the introduction of secondary air in an internal combustion engine is controlled to improve the cleanliness of the exhaust gas. Independently prepared air is supplied, as secondary air, to the exhaust system at a position downstream of the engine outlet. This secondary air is supplied only when the opening of the throttle valve is small, such as during idling or deceleration, thus bringing a three-way catalyst to either the oxidization atmosphere state or the stoichiometrical air-fuel ratio gas acceptance state. This control is carried out by feedback-control of the carburetor in accordance with, for example, the output signal of an $O_2$ sensor.

The above prior art control is carried out on the basis of slow air bleeding and main air bleeding in the carburetor system. In such control by air bleeding, however, fluctuations in the characteristics of the air-fuel ratio of the carburetor in the transient range from low speed running to high speed running of the internal combustion engine make it necessary to appropriately correct the air-fuel ratio to realize a constant value stoichiometrical air-fuel ratio in the gas supplied to the three-way catalyst. Failure to appropriately correct the air-fuel ratio results in a delay in control, and, accordingly, deteriorated cleanliness of the exhaust gas. For example, in the transient state from the slow air bleeding system to the main air bleeding system in the low speed and light load condition, a uniform air-fuel ratio of the gas supplied to the three-way catalyst could not be realized. Hence, the amount of the produced HC and CO would increase, and, accordingly, the exhaust gas cleanliness would deteriorate.

To counter the above problem, the pressure in the air intake pipe has been detected, and a signal representing the results of this detection has been supplied to a control circuit as a control input signal to change the control constants of the circuit. This method, however, necessitates additional devices, and, accordingly, makes the price of the entire system undesirably expensive.

SUMMARY OF THE INVENTION

It is the object of the present invention to provide an improved device for controlling the supply of secondary air in an internal combustion engine, by using a relatively simple device, in which the cleaning capability of HC, CO, and $NO_x$ in the exhaust gas during both idling and high load running is enhanced.

In accordance with the present invention there is provided a device for controlling the supply of secondary air in an internal combustion engine, comprising: a means for cleaning the engine exhaust gas of the three-way catalyst type in the engine exhaust pipe; an $O_2$ sensor in the engine exhaust pipe; a means for supplying secondary air to the engine exhaust pipe; a control circuit for receiving the output signal of the $O_2$ sensor and producing a control signal for air-bleeding control valves of the engine carburetor; and a secondary air control valve and a reed valve provided in the secondary air supplying means; the secondary air control valve being controlled in accordance with the opening degree of a throttle valve of the carburetor, wherein, when the opening degree of the throttle valve is small, the secondary air control valve is opened to supply a large amount of secondary air, while when the opening degree of the throttle valve is large, the secondary air control valve is closed to supply a small amount of secondary air.

DESCRIPTION OF THE PREFERRED EMBODIMENTS

Figure 1:
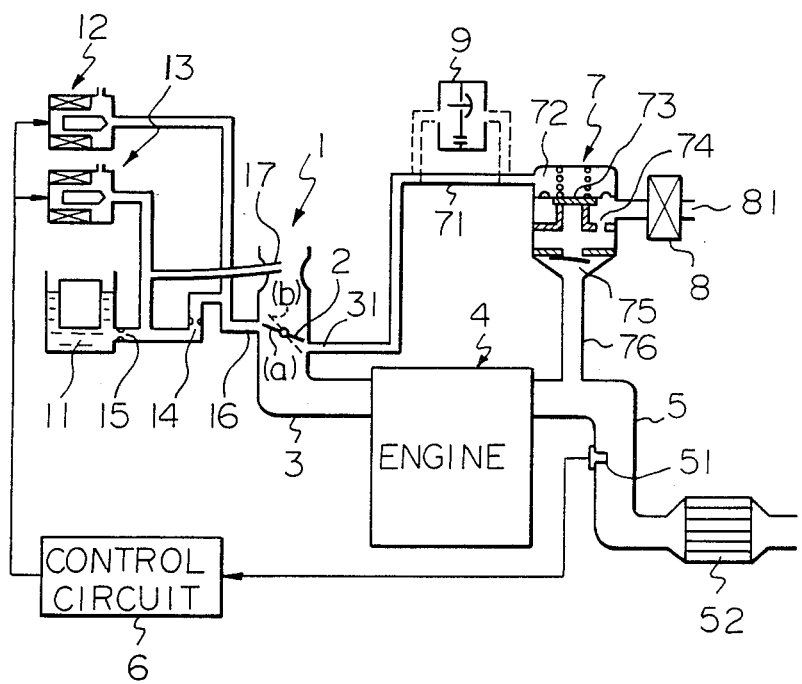
FIG. 1 illustrates a device for controlling the supply of secondary air in an internal combustion engine in accordance with an embodiment of the present invention.

The device for controlling the supply of secondary air in an internal combustion engine illustrated in FIG. 1 includes a carburetor 1 of an engine 4 having a main jet 15 and a slow jet 14, and a throttle valve 2. The fuel from a fuel tank 11 is spurted from a main nozzle 17 and a slow port 16. A control valve 12 for slow air bleeding and a control valve 13 for main air bleeding are provided in the paths of the fuel.

An $O_2$ sensor 51 and an exhaust gas cleaner 52 of the three-way catalyst type are provided in an exhaust pipe 5. The control circuit 6 receives the output signal of the $O_2$ sensor 51 and produces the control signals for the control valve 12 and the control valve 13.

The secondary air taken in from an air inlet 81 through a filter 8 is led to the exhaust pipe 5 through a secondary air control valve 7, a reed valve 75, and a supply pipe 76. An open-close portion 73 and a by-pass aperture 74 are provided in the secondary air control valve 7. The diaphragm chamber 72 of the secondary air control valve 7 communicates through a pipe 71 with an aperture 31 in an air intake pipe 3.

When the open-close portion 73 of the secondary air control valve 7 is in the open state, a great amount of secondary air is supplied to the exhaust pipe 5 through the open-close portion 73 and the by-pass aperture 74. When the open-close portion 73 is in the closed state, a small amount of secondary air is supplied to the exhaust pipe 5 through the by-pass aperture 74. The reed valve 75 is provided as a check valve to prevent the exhaust gas from flowing backward through the path of the secondary air when the pressure of the gas in the exhaust pipe 5 is increased.

The diaphragm chamber 72 communicates through the pipe 71 with the aperture 31 in the air intake pipe 3. Hence, when the opening degree of a throttle valve 2 is small (FIG. 1, (a)) such as during idling or deceleration, negative pressure is transmitted through the aperture 31 to the diaphragm chamber 72. Accordingly, the open-close portion 73 is opened. Contrary to this, when the opening degree of the throttle valve 2 is greater than a predetermined angle (FIG. 1, (b)), such as during running, atmospheric pressure is transmitted through the aperture 31 to the diaphragm chamber 72. Accordingly, the open-close portion 73 is closed.

Thus, when the opening degree of the throttle valve 2 is small, a great amount of secondary air is supplied to the exhaust pipe 5. Hence, the three-way catalyst of the exhaust gas cleaner 52 is brought to the oxidization atmosphere state, and, accordingly, the cleaning of HC and CO is accelerated. Since the generation of $NO_x$ is inherently less in this case, no acceleration of the cleaning of $NO_x$ by the three-way catalyst is needed.

Contrary to this, when the opening degree of the throttle valve 2 is greater than a predetermined angle, the supply of secondary air to the exhaust pipe 5 is restricted. That is, when the amount of the intake air in the carburetor is increased, the amount of secondary air supplied to the exhaust pipe 5 is decreased correspondingly. Hence, the exhaust gas supplied to the three-way catalyst of the exhaust gas cleaner 52 becomes rich and, accordingly, the cleaning of $NO_x$ is accelerated. In this state, there is less generation of HC and CO, hence, no particular acceleration of the cleaning of HC and CO by the three-way catalyst is needed.

Accordingly, the function of the three-way catalyst can be utilized throughout the idling and running states.

Figure 2:
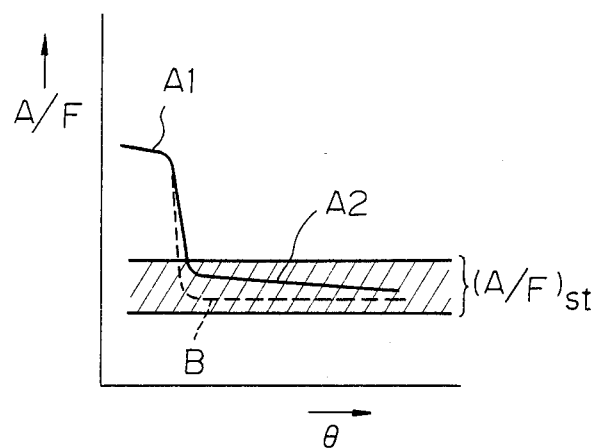
FIG. 2 illustrates the characteristic of the relationship between the opening of the throttle valve and the air-fuel ratio.

The characteristics of the relationship between the opening degree $\theta$ of the throttle valve and the air-fuel ratio A/F is illustrated in FIG. 2. The A1 portion of the A/F curve of FIG. 2 corresponds to the state in which the opening degree of the throttle valve is small and, hence, the supply of secondary air is large. The A2 portion corresponds to the state in which the opening degree of the throttle valve is greater than a predetermined degree and, hence, the supply of secondary air is small. The range (A/F)st of FIG. 2 is the range of approximate values of the stoichiometrical air-fuel ratio.

As shown in the A2 portion of the curve of FIG. 2, the air-fuel ratio A/F becomes only slightly richer, without departing from the range (A/F)st, in accordance with the increase of the opening degree $\theta$ of the throttle valve. This is because the secondary air is not particularly increased even when the opening degree of the throttle valve is further increased. The curve B in FIG. 2 represents the air-fuel ratio characteristic for the prior art device.

Although a preferred embodiment is described heretofore, various modifications of the present invention are possible. For example, as shown by the imaginary lines in FIG. 1, a negative pressure delay valve 9 may be inserted in the pipe 71 connecting the aperture 31 of the air intake pipe 3 with the secondary air control valve 7. The negative pressure delay valve 9 is provided from the viewpoint that, when the engine is changed from a high load running state to a deceleration state, a great amount of secondary air tends to be supplied suddenly, hence, an after-fire is apt to occur.

If the negative pressure delay valve 9 is inserted, the actuation of the open-close portion 73 of the secondary air control valve 7 is delayed only at the beginning of deceleration, allowing the supply of secondary air only through the by-pass aperture 74. Hence, no sudden supply of a great amount of secondary air will take place. When the state is changed from idling to acceleration, the open-close portion 73 is immediately closed without any delay. Hence, the supply of secondary air is decreased and, accordingly, the cleaning of $NO_x$ is accelerated.

Figure 3:
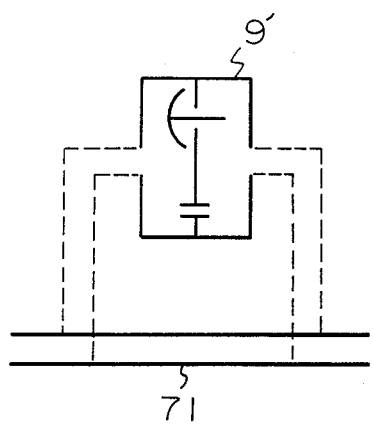
FIG. 3 illustrates a portion of another embodiment of the present invention.

It is also possible to provide a negative pressure delay valve 9' as illustrated in FIG. 3. The direction of the negative pressure delay valve 9' is opposite to that of the negative pressure delay valve 9 in FIG. 1. The provision of the negative pressure valve 9' in FIG. 3 means the decrease in the supply of secondary air is delayed through the beginning period of acceleration. Hence, the cleaning of HC and CO upon acceleration or gear-shifting is accelerated.

What is claimed is:

1. A device for controlling the supply of secondary air in an internal combustion engine, comprising:
    three-way catalyst type means for cleaning engine exhaust gas in an engine exhaust pipe;
    an $O_2$ sensor in the engine exhaust pipe;
    means for supplying secondary air to the engine exhaust pipe;
    control circuit means for receiving the output signal of said $O_2$ sensor and producing a control signal for air-bleeding control valves of an engine carburetor;
    secondary air control means having a secondary air control valve, a reed valve, a by-pass aperture for allowing a small amount of air to by-pass the secondary air control valve, and means for controlling said secondary air control valve in accordance with the opening degree of a throttle valve of said carburetor, such that, when the opening degree of said throttle valve is small, said secondary air control valve is opened to supply a large amount of secondary air, while when the opening degree of said throttle valve is large, said secondary air control valve is closed, allowing only a small amount of secondary air flow through said by-pass aperture; and
    wherein said secondary air control means further comprises negative pressure delay means for delaying actuation of said secondary air control valve upon the beginning of engine deceleration.

2. A device as defined in claim 1, wherein said secondary air control valve and said means for controlling the secondary air control valve further comprise a diaphragm chamber communicating through a pipe with an aperture in an air intake pipe.

3. A device as defined in claim 2, wherein the pressure of said diaphragm chamber changes in accordance with the opening degree of said throttle valve of said carburetor.

4. A device as defined in claim 2, wherein said secondary air control valve has an open-close portion actuated by the motion of said diaphragm and said open-close portion communicates through a filter with an air inlet for said secondary air supply means.

5. An apparatus for controlling the supply of secondary air to the exhaust system of an internal combustion engine, comprising:
    an air inlet;
    a secondary air control valve for regulating air flow between the air inlet and an exhaust manifold of the exhaust system, and having a main valve opening, a by-pass aperture, and a diaphragm for opening and closing said main valve opening, said diaphragm being spring biased to close said main valve opening and movable to an open position by application of low pressure to one side thereof, and said by-pass aperture allowing a small amount of air to flow between the air inlet to the exhaust manifold even when said main valve opening is closed by said diaphragm;
    a reed valve for regulating air flow between said secondary air control valve and said exhaust manifold such that air can flow from said secondary air control valve to said exhaust manifold, but not from said exhaust manifold to said secondary air control valve;

a pressure control line connected between a portion of a carburetor of said internal combustion engine next to a throttle valve thereof and a chamber on said one side of said diaphragm, an inlet of said control line in said carburetor being so positioned that when an opening degree of said throttle is small, low pressure is applied to said control line, thereby moving said diaphragm to open said main valve opening, and when the opening degree of said throttle exceeds a predetermined minimum, substantially atmospheric pressure air is applied to said control line, thereby moving said diaphragm to close said main valve opening; and a negative pressure delay valve in said control line, said delay valve allowing prompt transmission of the substantially atmospheric pressure from said control line inlet to said one side of said diaphragm, but allowing only delayed transmission of low pressure from said control line inlet to said one side of said diaphragm.

6. The apparatus of claim 5, wherein said delay valve comprises a main valve a by-pass aperture, said main valve being designed so as to open fully upon application of said substantially atmospheric pressure to a side thereof towards said control line inlet and to close upon application of low pressure to the side thereof towards said inlet of said control line, said by-pass aperture allowing a small air flow past said main valve even when said main valve is closed.

* * * * *

UNITED STATES PATENT AND TRADEMARK OFFICE
CERTIFICATE OF CORRECTION

PATENT NO. : 4,583,363
DATED : April 22, 1986
INVENTOR(S) : Urushidani et al

It is certified that error appears in the above-identified patent and that said Letters Patent is hereby corrected as shown below:

Column 6, line 9, after "valve" insert --having--.

Signed and Sealed this

Ninth Day of September 1986

[SEAL]

Attest:

DONALD J. QUIGG

Attesting Officer

Commissioner of Patents and Trademarks